Aug. 4, 1931.   M. P. E. HOHN   1,817,314
PLANETARY GEARING FOR DRIVING THE SHAFT OF THE ROTARY
CUTTER IN CIGARETTE ROD MAKING MACHINES
Filed Aug. 27, 1929   2 Sheets-Sheet 1

Inventor
Max Paul Ernst Hohn
by Max D. Ordmann
Atty.

Aug. 4, 1931.   M. P. E. HOHN   1,817,314
PLANETARY GEARING FOR DRIVING THE SHAFT OF THE ROTARY
CUTTER IN CIGARETTE ROD MAKING MACHINES
Filed Aug. 27, 1929   2 Sheets-Sheet 2

Inventor
Max Paul Ernst Hohn
by Max D. Ordmann
Atty.

Patented Aug. 4, 1931

1,817,314

UNITED STATES PATENT OFFICE

MAX PAUL ERNST HOHN, OF DRESDEN, GERMANY, ASSIGNOR TO THE FIRM "UNIVERSELLE" CIGARETTENMASCHINENFABRIK J. C. MULLER & CO., OF DRESDEN, GERMANY

PLANETARY GEARING FOR DRIVING THE SHAFT OF THE ROTARY CUTTER IN CIGARETTE ROD MAKING MACHINES

Application filed August 27, 1929, Serial No. 388,747, and in Germany April 18, 1929.

The invention relates to planetary gearing for driving the shaft of the rotary cutter in cigarette rod making machines. The invention has for its object to impart to the rotary cutter shaft an exceptionally high speed of rotation utilizing toothed or worm and worm wheel gearing. This object is attained in accordance with the present invention by the following features:—

(a) The arrangement that the cutter shaft is driven through the medium of an intermediate shaft mounted on a disc-like cutter shaft support gearing with a separately driven pinion rotatable about the axis of the rotation of the disc.

(b) The arrangement that the driven pinion rotatable about the shaft of the disc is formed as a bevel pinion and meshes with a bevel pinion mounted on the intermediate shaft extending parallel to the surface of the disc, the drive from the intermediate shaft to the cutter shaft at right angles to the disc being transmitted also through bevel pinion gearing.

(c) The arrangement that the bearing for the cutter shaft is also formed as a bearing for the intermediate shaft and is radially movable and adjustable on the disc body, the intermediate shaft being mounted so as to be longitudinally movable but not rotatable on the driving bevel pinion which is held in a bracket mounted on the disc.

(d) The arrangement that the drive for the intermediate shaft is transmitted by a worm or screw rotatable about the disc shaft the worm or worm wheel of which is mounted on the intermediate shaft which drives by means of a worm or worm wheel the cutter shaft.

(e) The arrangement that the intermediate shaft carrying the worm or worm wheels is pivotally mounted and longitudinally movable on the bearing for the cutter shaft.

(f) The arrangement that the shaft of the disc is hollow and is mounted in a hollow bush in which the driving shaft for the driving pinion rotates, this shaft rotating in the opposite direction to that of rotation of the shaft of the disc.

The present invention covers not only the combination of the arrangements recited in (a) to (f), but also each arrangement per se so far as it is novel.

Figure 1:
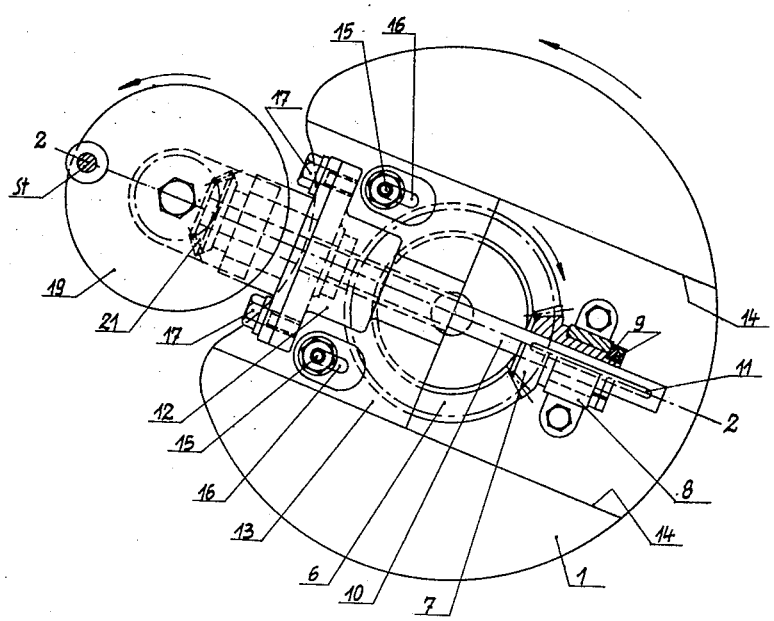
Figure 2:
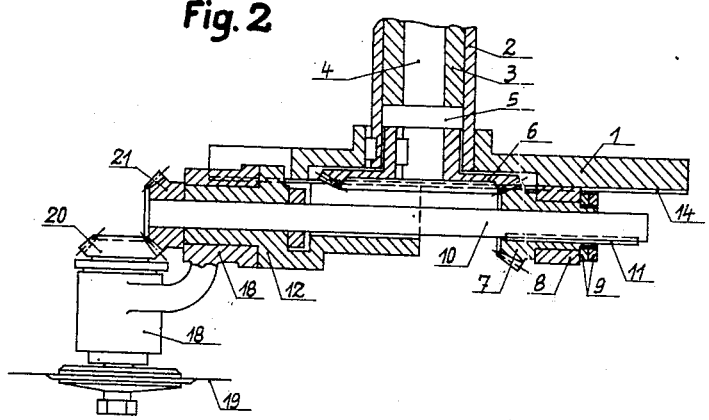
Figure 3:
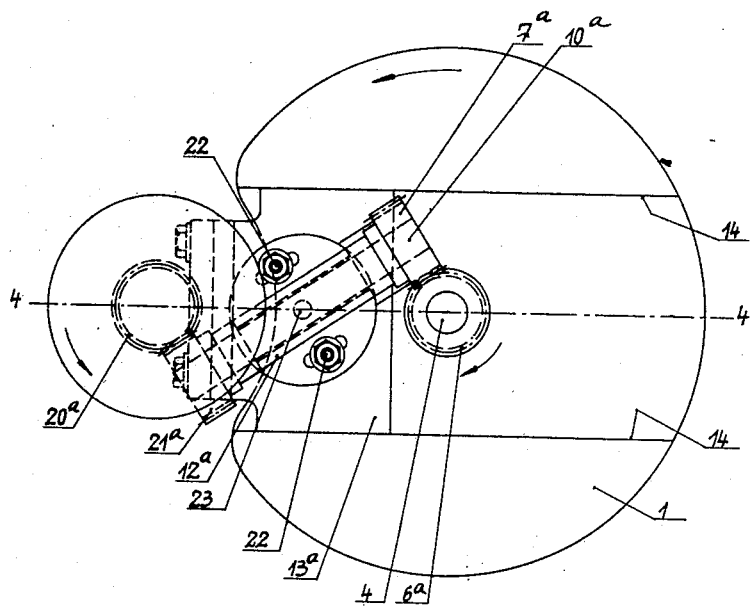
Figure 4:
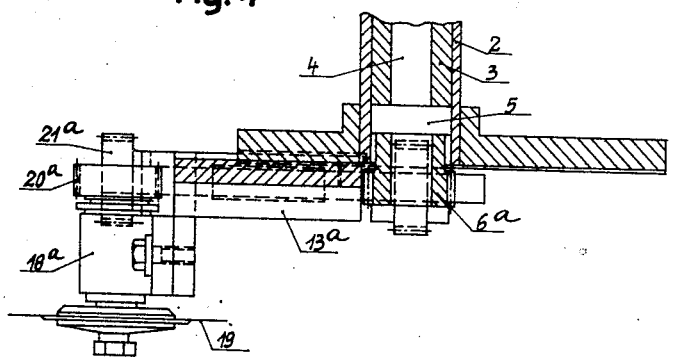

The invention is illustrated in the accompanying drawings in which Fig. 1 shows one embodiment of the new device in front view, partly in vertical cross section, Fig. 2 being a section on the line 2—2 of Fig. 1. Figs. 3 and 4 show in front view and in cross section on the lines 4—4 of Fig. 3, respectively, a further embodiment.

Referring to Figs. 1 and 2 the disc 1 serves as a support for the cutter shaft. The disc is secured to its shaft 2. This shaft rotates about the fixed bush 3, the shaft 2 being driven by means not shown in the drawings.

Into the hollow bush 3 extends a shaft 4 provided with a collar 5. On the end of shaft 4 is keyed the bevel pinion 6. The shaft 4 is driven by means not shown and is rotated in the opposite direction to the shaft 2 of the disc 1.

A bevel pinion 7 meshes with the bevel pinion 6. Bevel pinion 7 is secured in the bearing 8 by means of nuts 9. The bearing 8 is secured by set screws or the like to the disc 1. Shaft 10 extends through a central orifice in the bevel pinion 7, which is keyed to the shaft by a key 11. The shaft 10 is, however, movable longitudinally in the central orifice in the bevel pinion. The other end of shaft 10 is mounted so as to be rotatable but not longitudinally movable in a bearing 12 which is carried by a slide 13 movable radially on the disc 1 in suitable guides 14. This slide can be secured by means of set screws 15 in any desired position. The set screws extend through radial slots 16 in the slide. On the bearing 12 is secured by set screws 17 a bearing bracket 18 carrying the shaft of the cutter 19. On this shaft is mounted a bevel pinion 20 which meshes with the bevel pinion 21 on the intermediate shaft 10.

The disc 1 is rotated in the direction of the arrow indicated in Fig. 1. The bevel pinion 7 thus rotates around bevel pinion 6, so that the cutter shaft is driven from the intermediate shaft 10. Now, however, the shaft 4 of the bevel pinion 6 is separately set in rotation in the direction of the arrow in Fig. 1 and the intermediate shaft 10 has thus imparted to it an additional rotation, so that the cutter 19 rotates in the direction of the arrow indicated in Fig. 1 at a high speed. The cutter in known manner comes once on each rotation of the disc 1 into contact with the cigarette rod.

Adjustment of the slide 13 is quite easy so that the cutter can always be readjusted.

In the embodiment shown in Figs. 3 and 4 there is shown the disc 1 with its shaft 2 which is rotatable on the fixed bush 3, while the shaft 4 with its collar extends into the bush 3. On this shaft is mounted a worm wheel $6^a$ which meshes with a worm wheel $7^a$ on the intermediate shaft $10^a$. The other end of the shaft 10 has mounted thereon a worm wheel $21^a$ which meshes with the worm wheel 20 on the shaft of the cutter 19. In this instance also the bearing bracket $18^a$ of the cutter shaft is connected by set screws or the like with a slide $13^a$ which is radially movable in guides 14 on the disc 1, and can be secured as in the embodiment shown in Figs. 1 and 2. The intermediate shaft $10^a$ is mounted in a bearing $12^a$ on this slide. This bearing is secured by set screws 22 to the slide $13^a$. The bolts of these set screws extend through slots concentric with the axis of rotation 23, so that the bearing can be rotated and correspondingly adjusted about the axis of rotation 23 which lies in the line connecting the driving shaft 4 and the cutter shaft.

I claim:—

1. A planetary gearing for the rotary cutter of a cigarette making machine, comprising in combination with the cutter shaft, a rotary disk-like support for said shaft arranged and revolving in a plane perpendicular to said shaft, an independently driven intermediate shaft mounted on said support and extending parallel to the plane of the latter and means for transmitting rotation from said intermediate shaft to said cutter shaft.

2. A planetary gearing for the rotary cutter of a cigarette making machine, comprising in combination with the cutter shaft, a rotary disk-like support for said shaft arranged and revolving in a plane perpendicular to said shaft, an independently driven intermediate shaft slidably mounted on said support and extending parallel to the plane of the latter and means for transmitting rotation from said intermediate shaft to said cutter shaft.

3. A planetary gearing for the rotary cutter of a cigarette making machine, comprising in combination with the cutter shaft, a rotary disk-like support for said shaft arranged and revolving in a plane perpendicular to said shaft, said support having a hollow shaft, a driven shaft borne in said hollow shaft, a slide guided in said support, an intermediate shaft mounted in said slide and extending parallel to the plane of the said support, bevel gears between said driven shaft and said intermediate shaft and bevel gears between said intermediate shaft and said cutter shaft.

4. A planetary gearing as per claim 2, in which the bearing of said intermediate shaft is mounted on a slide mounted in guides of said support and carrying bearings for the cutter shaft and means for fixing the said slide in the desired position.

5. A planetary gearing for the rotary cutter of a cigarette making machine, comprising in combination with the cutter shaft, a rotary disk-like support for said shaft arranged and revolving in a plane perpendicular to said shaft, said support having a hollow shaft, a driven shaft borne in said hollow shaft, a slide guided in said support an intermediate shaft mounted in said slide extending parallel to the plane of said support, worm gears between said driven shaft and said intermediate shaft and worm gears between said intermediate shaft and said cutter shaft.

6. A planetary gearing as per claim 5, in which the bearing of said intermediate shaft is rotatably mounted on said slide.

In testimony whereof I affix my signature.

MAX PAUL ERNST HOHN.